United States Patent
Vissers

[15] 3,705,630
[45] Dec. 12, 1972

[54] AGRICULTURAL IMPLEMENT FOR CLOD BREAKING

[72] Inventor: Herbert Vissers, Nieuw-Vennep, Netherlands

[73] Assignee: Landbouwwerktuigen-en Machinefabriek H. Vissers N.V., Binnenweg, Rotterdam, Netherlands

[22] Filed: Feb. 2, 1970

[21] Appl. No.: 8,045

[30] Foreign Application Priority Data

Feb. 3, 1969 Netherlands .......................6901676

[52] U.S. Cl. ..................172/713, 172/763, 306/1.5, 287/56
[51] Int. Cl. ....A01b 23/02, A01b 19/02, A01b 35/22
[58] Field of Search .......172/763, 713, 635; 306/1.5; 287/56; 182/222; 85/32

[56] References Cited

UNITED STATES PATENTS

| | | | |
|---|---|---|---|
| 2,195,590 | 4/1940 | Eksergian | 85/32 |
| 3,463,242 | 10/1969 | Morkoski | 306/1.5 X |
| 3,532,171 | 10/1970 | Kasten | 172/713 X |

FOREIGN PATENTS OR APPLICATIONS 1,090,009  11/1967  Great Britain.......................172/713

Primary Examiner—Robert E. Pulfrey
Assistant Examiner—Stephen C. Pellegrino
Attorney—Snyder and Butrum

[57] ABSTRACT

An agricultural implement for clod breaking, comprising a hollow support, for instance of tubular or U-section, and a plurality of clod breaking members extending through recesses in the top and bottom walls of said support and attached thereto by screwed connections.

For providing a rigid support having thin walls and a rigid attachment of the clod breaking members these clod breaking members are inserted through bushes which support the top and bottom walls of said support against being displaced inwardly.

5 Claims, 10 Drawing Figures

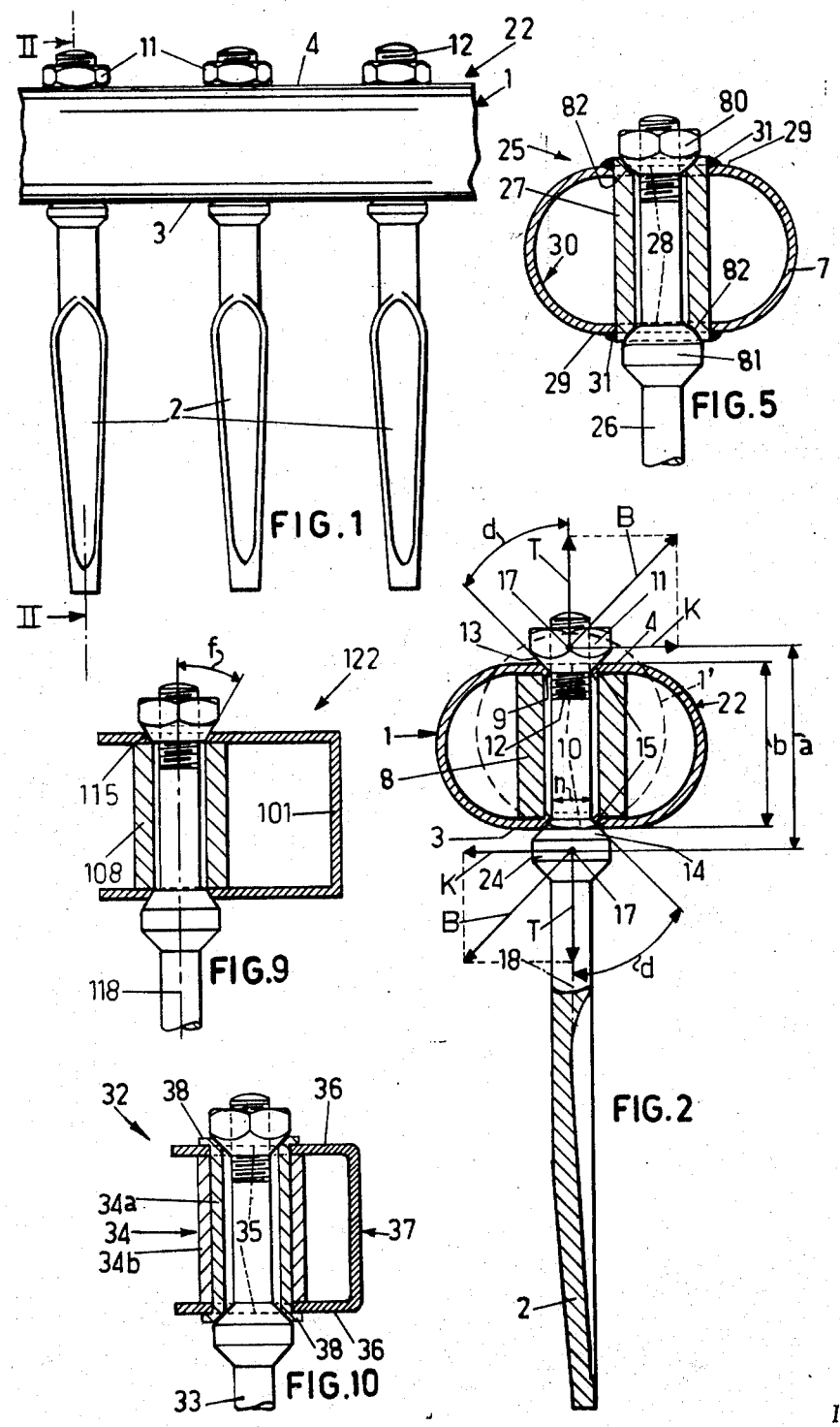

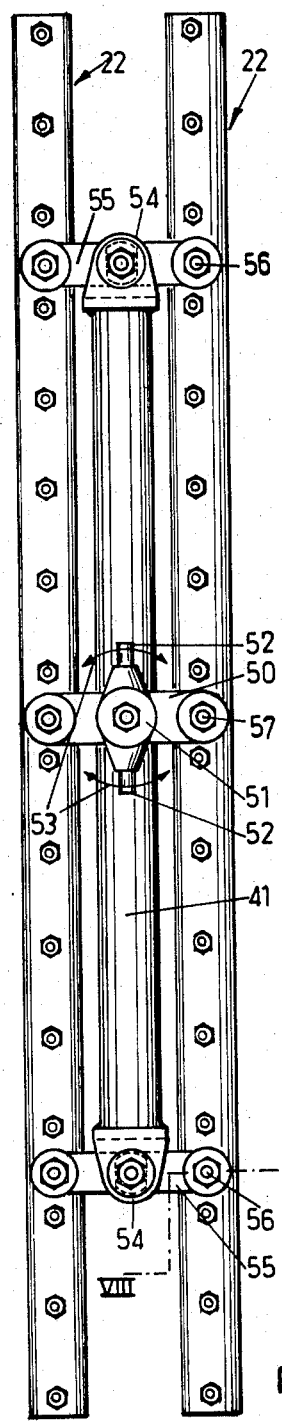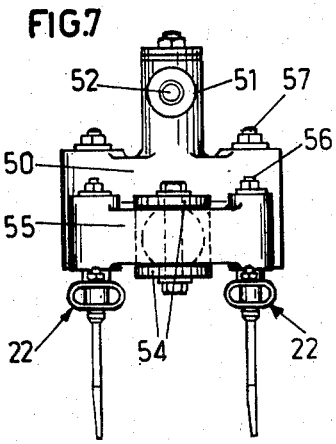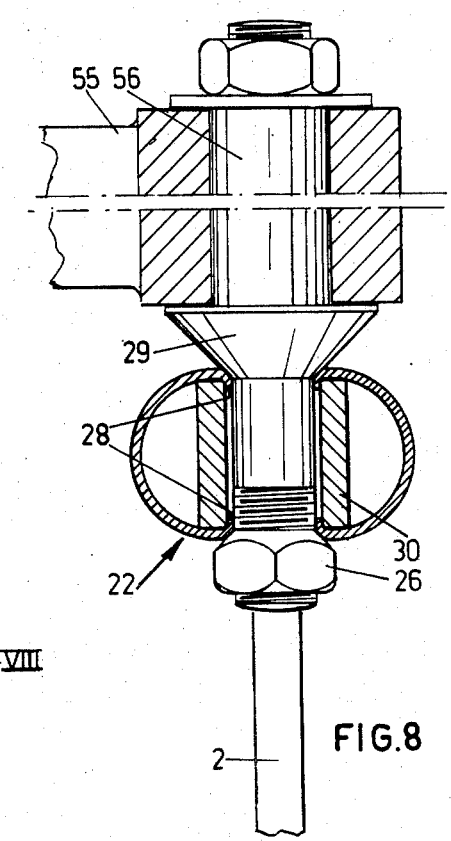

AGRICULTURAL IMPLEMENT FOR CLOD BREAKING

The invention relates to an agricultural implement for clod breaking, comprising a hollow support, for instance of tubular or U-section, and a plurality of clod breaking members extending through recesses in the top and bottom walls of said support and attached thereto by screwed connections.

An agricultural implement of the kind specified is known. The invention provides an agricultural implement of the kind specified in which the wall thickness of said support can be small, although said support is rigid enough for clod breaking members to be screwed thereto with considerable clamping force. To this aim the clod breaking members are inserted through bushes which support the top and bottom walls of said support against being displaced inwardly.

These and other features of the invention will be clearly gathered from the following description with reference to the drawings, wherein:

FIG. 1 is a front elevation of a detail of a preferred embodiment of an agricultural implement according to the invention in the form of a harrow beam, FIG. 2 is a section, to an enlarged scale, taken along the line II—II in FIG. 1;

FIGS. 5, 9 and 10 are sections, corresponding to FIG. 2, through a variant embodiment of an agricultural implement according to the invention in the form of a harrow beam;

FIGS. 6 and 7 are a plan view and side elevation respectively of a portion of a harrow with a harrow beam as illustrated in FIGS. 1 and 2, and FIG. 8 is a partial section, to an enlarged scale, taken on the line VIII—VIII in FIG. 6.

Figure 3:
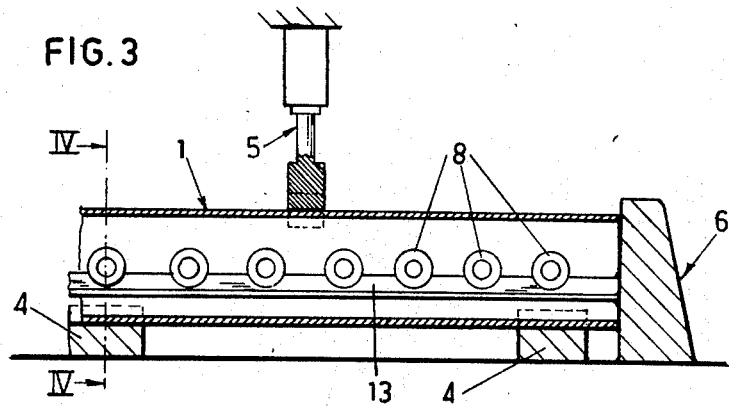
FIG. 3 is a longitudinal section through an apparatus for making an agricultural implement as shown in FIGS. 1 and 2.

Referring to FIGS. 1 and 2, a harrow beam 22 consists of a support 1 of flattened tubular section, to which tines 2 are attached forming clod breaking members.

The support 1 is formed by flattening a round, preferably seamless, thin-walled tube 1'. Such flattening can readily be performed by pressing a round tube 1' flat to a predetermined extent in a press, producing flat surfaces 3 at the top and bottom, and rounded portions 7 at the front and rear sides.

The support 1 has bushes 8 spaced out regularly between recesses 10 in the flat surfaces 3. The bushes 8 are retained in place by inwardly directed edges 9.

Extending through the recesses 10 and the bushes 8, are members in the form of tines 2 each of which is screwed tight by means of a nut 11 screwed to its threaded end 12 and having a conical seating surface 13, each tine 2 bearing via a collar 24 having a conical seating surface 14 against the bottom of the support 1. The bushes 8 clamped tightly in this way increase the rigidity of the support 1, which has high torsional rigidity, due to its shape, so that the wall thickness of the support 1 can be small.

Figure 4:
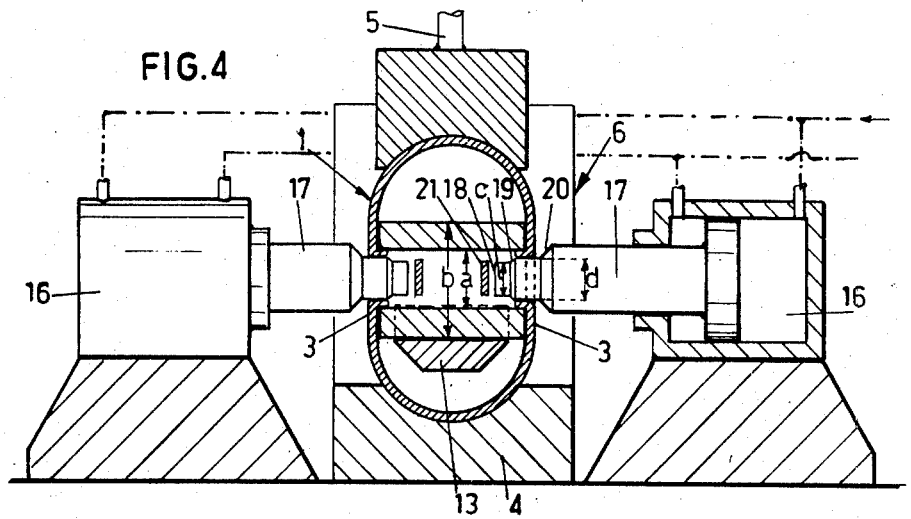
FIG. 4 is a cross-section, to an enlarged scale, taken along the line III—III in FIG. 3 at a subsequent stage of manufacture.

The bushes 8 are formed in the support 1 by an apparatus as shown in FIGS. 3 and 4, comprising a frame 6 and means for retaining the support 1 consisting of supports 4 and a frame 5, a retaining member 13 for receiving bushes 8, by means of which the bushes 8 are retained in place when the support 1 is disposed in the axial direction on the retaining member 13, and a number of press tools 17 which are disposed in pairs opposite the places of attachment on either side of the support 10 and which are simultaneously driven towards or away from one another by rams 16.

At their free ends the press tools 17 have punching tools 18 having a diameter $c$ smaller than the inside diameter $a$ of the bushes 8. Coaxially adjoining the punching tools 18 are deforming tools 19, 20. The punching tools 18 punch out discs 21, thus forming recesses 10 in the opposite walls 3. The edges of the recesses 10 are deformed inwardly into the bushes 8 by the deforming tools 19. The recesses are then so deformed by the deforming tools 20, that conical seating surfaces 23 are produced for knobs 24 of the tines 2 to be attached, and also for the conical nuts 11 to be screwed on to the threaded ends 12 of the tines 2. The deformation of the edges of the recesses 10 produces an inside diameter $d$ which is greater than the diameter $c$ of the discs 21, so that after the withdrawal of the press tools 17, the discs 21 can drop out of the bushes 8. The following is an example of the dimensions indicated in the drawings:

$$a = 24, b = 38, c = 19 \text{ and } d = 22 \text{ mm}.$$

The operation pressure of the rams 16 is so great, for instance, three times the tightening stress of the tines 2, that the surface pressure prestress of the surfaces 15 is substantially greater than the surface pressure which can be produced by tightening up the nuts 11 strongly.

When the bushes 8 have been attached to the support 1, after the withdrawal of the ram 5, the support 1 can be lifted from the retaining member 13 and moved away therefrom.

The angle $d$ which the seats 15 and the seating surfaces 13, 14 enclose with the centerline 18 of the tine 2 is 45°.

The conical seats 15 and the seating surfaces 13 and 14 bearing thereagainst prevent the screwthreaded end 12 from being subjected to shearing stresses. The clearance between the end 12 and the recesses 10 therefore has no effect.

If the tine 2 exerts a moment M on the support 1, such moment is taken up by the forces K with a moment arm $a$ which is greater than the height $b$ of the support 1.

The lines of force through the seats 15 intersect the centerline of the tines 2 in points 17. The forces B are composed of the components K and T, T being the tensile force in the end 12 of the tine 2.

With the thin-walled support 1, this tensile force T is taken up by bush 8.

The harrow beam 25 illustrated in FIG. 5 has around each tine 26 a bush 27 which extends through recesses 28 in the top and bottom walls 29 of a tubular support 30 and is connected thereto by welds 31. The nut 80 and the knob 81 of the tine 26 support upon basin-shaped seating surfaces 82 of the bush 27.

Of a harrow frame to be suspended from a tractor, FIGS. 6 and 7 show only a transverse girder 41 having U-shaped bearing members 54 adapted to bear pivotably levers 55 pivoting around pins 56 of harrow beams 22. Mounted in the transverse girder 41 is a crank 51 having pins 52 with which a driving mechanism (not shown) engages to drive the crank 51 oscillatably in the direction indicated by arrows 53, the crank 51 engaging via crank arms 50 with pins 57 of the harrow beams 22.

Each pin 56, 57 is rigidly attached to the support 1 by extending through the hollow support 1 and a bush 39 tightly retained therein by edges 28, and by the support 1 also being clamped between a conical knob 29 and a conical nut 26. The lever 55 is pivotably connected between the knob 29 and the nut 26.

If neither the nut 11, 26 nor the knob 24, 29 are conical, the distance $b$ required for firm attachment is about 8–10 $n$, $n$ being the diameter of the clamped harrow tine or the like. However, if only the nut 11, 26 or only the knob 24, 29 is conical, the required distance $b$ is about 4 $n$, while if both the nut 11, 26 and the knob 24, 29 are conical, the required distance $b$ is only about 2 $n$.

The support 101 of harrow beam 122 shown in FIG. 9 consists of a U-profile, while the seats 115 enclose an angle $f$ of 30° with the centerline 118.

The harrow beam 32 illustrated in FIG. 10 has around each tine 33 a bush 34 consisting of an outer bush 34b and an inner bush 34a extending through recesses 35 in the top and bottom walls 36 of the U-shaped support 37 and attached thereto by bending edges 38 over the outsides of the walls 36 and upsetting the bushes 34a and 34b.

To prevent the bushes 34 from rotating in the support 37, the bushes 34a and the recesses 35 are non-circular.

The walls of each of the harrow beams 22, 25 and 32 can be thin, since the bushes 8, 27 and 34 respectively take up the tightening forces of the screwed connections and a substantial proportion of the loading exerted on the beams by the ground. The harrow beam 22 is more preferable, due to its simple manufacture.

The clod breaking members may consist of harrow tines, but also of hooks or blades. All these clod breaking members are able to break clods of the treated ground.

What I claim is:

1. An agricultural implement for clod breaking comprising, in combination:
   support means including an elongate support member having spaced, and relatively thin integral upper and lower walls provided with longitudinally spaced aligned pairs of openings;
   a plurality of elongate clod breaking members, each having a shank portion provided at one end thereof with an enlarged collar and having a screw thread portion at the opposite end of the shank portion, each member having its shank portion projected through an associated pair of said aligned openings, and an enlarged nut member engaged on each screw thread portion and cooperating with a respective collar to clamp tightly upon the support means with force sufficient to crush said upper and lower walls together; and
   said support means also including tubular bushing means surrounding each shank portion between said upper and lower walls for taking the clamping action of each member and preserving the integrity of spacing between said upper and lower walls;
   said support member being in the form of an initially circular tube having its upper and lower walls flattened to engage the opposite ends of said bushings.

2. An agricultural implement as defined in claim 1 wherein the openings of each pair are of diameters smaller than said bushings, said upper and lower walls being flattened to abut the opposite ends of said bushings.

3. An agricultural implement as defined in claim 2 wherein each bushing presents a bore of predetermined diameter and said openings in said upper and lower walls are of smaller size than said predetermined diameter, the marginal areas of said walls surrounding said openings being directed inwardly within the confines of said bushings.

4. An agricultural implement as defined in claim 1 wherein the marginal edges of said areas are conically deformed into the confines of said bushings, each collar and nut having a conical surface seating on such conical areas.

5. An agricultural implement for clod breaking comprising, in combination:
   support means including an elongate support member having spaced, and relatively thin integral upper and lower walls provided with longitudinally spaced aligned pairs of openings;
   a plurality of elongate clod breaking members, each having a shank portion provided at one end thereof with an enlarged collar and having a screw thread portion at the opposite end of the shank portion, each member having its shank portion projected through an associated pair of said aligned openings, and an enlarged nut member engaged on each screw thread portion and cooperating with a respective collar to clamp tightly upon the support means with force sufficient to crush said upper and lower walls together; and
   said support means also including tubular bushing means surrounding each shank portion between said upper and lower walls for taking the clamping action of each member and preserving the integrity of spacing between said upper and lower walls;
   said support means including conical support surfaces for each collar and nut and wherein each collar and nut present conical seating surfaces engaged with respective support surfaces.

* * * * *

UNITED STATES PATENT OFFICE
CERTIFICATE OF CORRECTION

Patent No. 3,705,630                    Dated December 12, 1972

Inventor(s) Herbert Vissers

It is certified that error appears in the above-identified patent and that said Letters Patent are hereby corrected as shown below:

Name of assignee is: H. Vissers N.V.
                          Nieuw-Vennep, The Netherlands Signed and sealed this 13th day of November 1973.

(SEAL)
Attest:

EDWARD M. FLETCHER, JR.              RENE D. TEGTMEYER
Attesting Officer                    Acting Commissioner of Patents